(12) United States Patent
Powers et al.

(10) Patent No.: US 7,913,115 B1
(45) Date of Patent: Mar. 22, 2011

(54) CORE FILE TRANSFER

(75) Inventors: Michael Eric Powers, San Jose, CA (US); Sam Varghese, Cupertino, CA (US); Pradeep Kumar Kalra, San Jose, CA (US); Joshua K. Liu, Los Angeles, CA (US); Muthukumar Ratty, Sunnyvale, CA (US); Ganesh Ragavan Narayanan, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 344 days.

(21) Appl. No.: 12/112,564

(22) Filed: Apr. 30, 2008

(51) Int. Cl.
*G06F 11/00* (2006.01)

(52) U.S. Cl. .......................................... 714/18; 714/749
(58) Field of Classification Search .................... 714/18, 714/715, 748, 749
See application file for complete search history.

(56) References Cited

U.S. PATENT DOCUMENTS

| | | | | |
|---|---|---|---|---|
| 5,768,528 | A * | 6/1998 | Stumm | 709/231 |
| 6,381,709 | B1 * | 4/2002 | Casagrande et al. | 714/18 |
| 6,615,383 | B1 * | 9/2003 | Talluri et al. | 714/749 |
| 6,728,897 | B1 | 4/2004 | Cramer et al. | |
| 6,741,554 | B2 * | 5/2004 | D'Amico et al. | 370/225 |
| 6,859,462 | B1 * | 2/2005 | Mahoney et al. | 370/428 |
| 7,013,419 | B2 * | 3/2006 | Kagan et al. | 714/749 |
| 7,039,828 | B1 | 5/2006 | Scott | |
| 7,051,050 | B2 | 5/2006 | Chen et al. | |
| 7,117,303 | B1 | 10/2006 | Zayas et al. | |
| 7,657,815 | B2 * | 2/2010 | Seidel et al. | 714/748 |
| 7,693,070 | B2 * | 4/2010 | Rider et al. | 370/237 |
| 7,783,930 | B2 * | 8/2010 | Gilge | 714/43 |
| 2002/0032884 | A1 * | 3/2002 | Kobata et al. | 714/18 |
| 2002/0116593 | A1 | 8/2002 | Kazar et al. | |
| 2003/0169687 | A1 * | 9/2003 | Bardini et al. | 370/229 |
| 2009/0006920 | A1 * | 1/2009 | Munson et al. | 714/748 |
| 2009/0070649 | A1 * | 3/2009 | Aldana et al. | 714/748 |
| 2009/0271681 | A1 * | 10/2009 | Piret et al. | 714/749 |

* cited by examiner

*Primary Examiner* — Marc Duncan
(74) *Attorney, Agent, or Firm* — Cooper Legal Group, LLC

(57) ABSTRACT

A core file that may be generated when a data storage system encounters a problem can be automatically and securely sent to a remote (e.g., offsite) support enterprise. Moreover, given the size of such files and the additional requirements associated with sending such files securely, the transmission of the core file may be monitored such that, if a problem occurs during the transmission, the pieces of the file that have been successfully transmitted are not resent, but merely those pieces that still need to be (successfully) transmitted. In this manner, the time and resources required to securely transmit such large files are more efficiently utilized.

20 Claims, 7 Drawing Sheets

CORE FILE TRANSFER

BACKGROUND

Managing data storage is critical to businesses and individuals that rely of the continued use and security of their stored data. Therefore, when a data storage system goes down, getting the system back up and running is often crucial to continued operations. Typically, when a storage system encounters an unrecoverable error a core dump occurs, which creates a core file containing a snapshot of the storage system's processor state and/or memory. This core file is used by technicians to evaluate system errors and to get a system running again.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A core file is a diagnostic aid used by support engineers to help diagnose and fix system problems. They can be generated, for example, by a storage system (e.g., a network server configured with one network attached storage device or a cluster of network attached storage devices) when an unrecoverable error occurs. When such an error occurs, a snapshot of the system's memory may be dumped (core dump) into a core file. When a core file is generated, technicians can review the information to find potential reasons for the unrecoverable error, and to develop patches or workarounds. However, technicians that work with large storage systems are not typically onsite to review the core file. Therefore, a core file is usually sent to a system support center (e.g., a support enterprise) either by uploading it to the support center or by putting it on portable storage (e.g., a disk) and sending it to the support center. Since it is generally more convenient, uploading a core file is typically the desired way to get it to a support center. However, core files may be large (e.g., 12 gb) in size, and because they are typically transferred using secure methods, it often takes a significant amount of time (e.g., up to two-days) to upload a complete core file to the support center. During a core upload, if a problem arose that stopped the transmission of the core file, the process may need to be restarted from the beginning, which adds to the overall transfer time.

Getting a core file to a support center as quickly as possible, so that technicians can begin diagnosing and fixing a problem, is often extremely important for continued operations, for example, in a business that uses networked storage systems. Techniques and systems for monitoring a sending of a core file from a remote system to a support enterprise are described herein, such that, if a problem in the sending occurs, the sending may restart from a place where it left off. The techniques and systems use an agent on the remote system to collect respective chunks of the core file and send the chunks to the support enterprise. The agent, on the remote system, and a corresponding component on the enterprise side monitor the transmission of a chunk, such that each side agrees that the chunk has arrived before a next chunk is sent by the agent (e.g., chunks may be sent consecutively until the entire core file has been sent and received). If either side detects that a chunk has not been successfully received by the support enterprise (e.g., if a power failure occurs at the remote system and the enterprise system does not hear from the agent within a time out period) the sending of the core file is restarted by sending a chunk of the core file that is next in line to be sent after a last core file chunk that was successfully sent and received.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
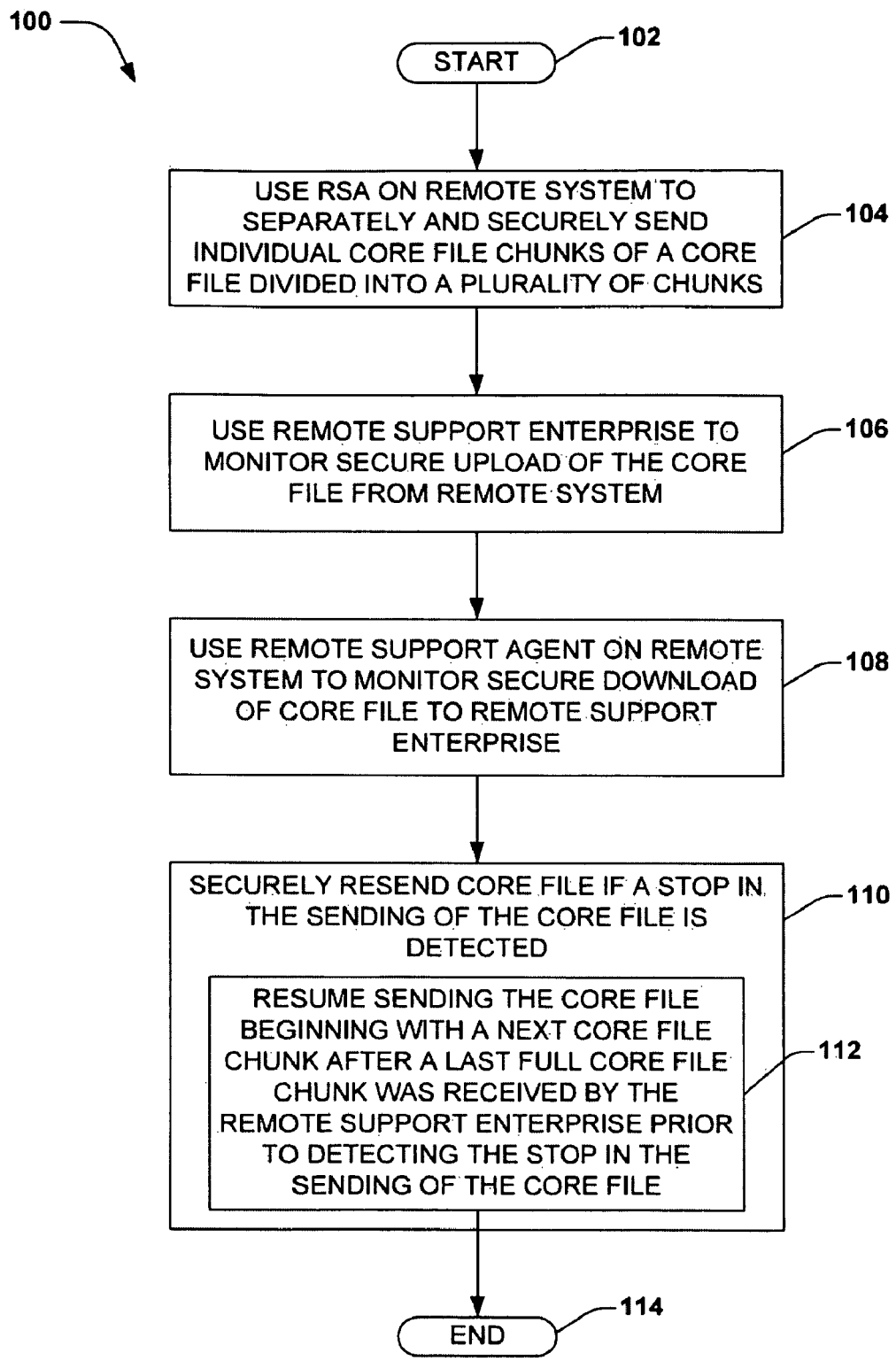
FIG. 1 is a flow diagram illustrating an exemplary method for automatically sending a core file.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A core file generated by a core dump is typically a snapshot of the system's memory, and generally has a file size as large as the system's memory (e.g., twelve gigabytes (GB) or more). Further, because core files can contain information that, for example, a business may want to keep secure (e.g., business sensitive information that others may attempt to steal), it may be desirable to transmit the core file securely when using the Internet for transmittal. Typically, sending data over the Internet using secure techniques takes longer than when sending without secure techniques, at least because encryption and/or decryption techniques may be implemented. Therefore, sending large core files securely over the Internet can often take a long time (e.g., multiple days). Further, core file transmittal times can be affected by connection speeds on either end of the transmittal. When a problem occurs that prevents the entire core file from being transmitted (e.g., a connection goes down during core file transmission), or the file is corrupted, the entire core typically needs to get retransmitted. Therefore it may be desirable to monitor secure core file transmission, and transmit a core file in such a way that when a problem occurs it can be identified quickly and retransmission can begin at a place where it left off.

Embodiments described herein relate to techniques and systems for automatically securely sending a core file from a remote system to a support center (e.g., a remote support enterprise), and monitoring the sending, such that if the sending is stopped (e.g., the remote systems encounters a power failure during sending) the stop can be detected and the core file can be resent from a place where the sending stopped, instead of resending the entire file.

Figure 3:
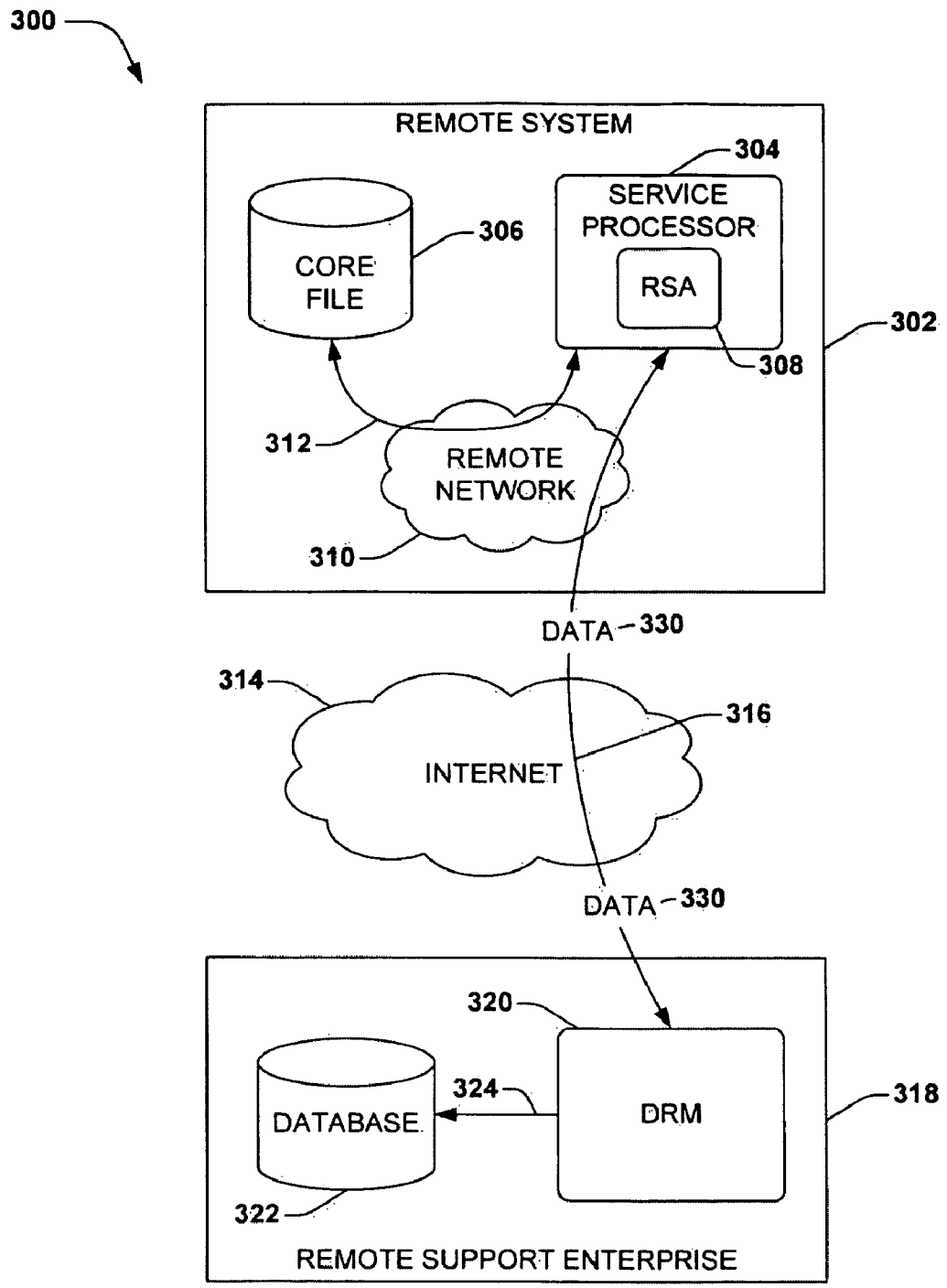
FIG. 3 is an illustration of an exemplary configuration of a remote system and a remote support enterprise.

An example 300 of how a remote system may be configured to communicate with a support enterprise is illustrated in FIG. 3. A remote system 302 containing a remote network 310 (e.g., a business network of computers, servers, and/or storage devices) communicates 316 to a remote support enterprise (RSE) 318 via the Internet 314 (and/or other communication networks). By way of example, Hypertext Transfer Protocol over Secure Socket Layer (HTTPS) may be implemented in facilitating such communication. The remote system 302 may use a service processor module 304 to communicate with the RSE 318 in order to create a secure connection. The service processor 304 can contain a remote support agent (RSA) 308 that is configured to automatically securely send information (e.g., data 330) to and receive information (e.g., data 330) from the remote support enterprise 318. That is, the RSA 308 generally comprises a program that can automatically diagnose and act upon the remote system 302, and interactively communicate with an RSE 318. In this way, the RSE 318 can automatically support the remote system on an as-needed basis. A device relationship manager (DRM) 320 in the RSE 318 can be configured to manage the information (e.g., data 330) that comes in from the remote system 302 and, in turn, send information (e.g., data 330) to appropriate systems in the remote system 302, as well as managing commands that go out to the remote system 302.

In this example, if a core file 306 were created, the RSA 308 can call for the file 306 and automatically notify the DRM 320 in the RSE 318 that a core file has been created. The DRM can then issue a "send core file" command to the RSA 308, and the file can be transmitted 312 through the remote network 310 to the service processor 304, and then securely sent 316, for example, over the Internet 314 (e.g., using secure socket of hypertext transfer protocol) to the remote enterprise 318. At the RSE 318, the DRM 320, which had sent a "send core file" command to the RSA 308, can collect the incoming core file and transfer it 324 to a database 322 in the RSE 318 for later use in conducting a diagnostic. It will be appreciated that while a RSE may be configured to perform some automatic diagnostics on the core file, technicians may also need to review the file for a more detailed analysis. It will also be appreciated that the RSA 308 may be located on a service processor module (e.g., a communications, card) of the remote system 302, and the RSA may comprise computer programming code within an operating system, for example, configured to act as an agent for the RSE in the remote system, and to communicate with the RSE. It will be appreciated that a RSA can be implemented in hardware, firmware and/or software, and may be located in/on a variety of components of the remote system, such as within different applications and/or in different layers of an operating system, for example.

In one embodiment, a core file may be divided into smaller "chunks" that can be individually collected and separately and securely sent from the remote system to a support enterprise. The sending of the individual core file "chunks" may be monitored for problems, such that both the remote system and the support enterprise would agree that a "chunk" of the core file was received by the support enterprise. If a problem occurs during transmission, the monitoring would detect the interruption, and begin resending the core file. The resending may start by sending the core file chunk that comes after the last core file chunk that was fully received by the support enterprise. In this manner, only a part of the core file that had not been successfully sent is resent, instead of the entire file.

FIG. 1 is a flow diagram illustrating an exemplary method 100 for automatically and securely sending a core file from a remote system to a remote support enterprise, beginning at 102. Prior to the method beginning the sending of the core file, the core file has been divided into individual chunks (e.g., individual files smaller than the core file). At 104, respective individual core file chunks of a core that has been divided into a plurality of core chunks are sent securely and separately using a remote support agent on a remote system. By way of example, Hypertext Transfer Protocol over Secure Socket Layer (HTTPS) may be implemented in facilitating this secure communication, as well as encryption and/or decryption techniques. During the secure sending of the core file, uploading of the core file from the remote system is monitored by the remote support enterprise at 106 (as the remote support enterprise "looks" for the file uploads performed by the remote system). Also during the secure sending of the core file, downloading of the core file to the remote support enterprise is monitored by the remote support agent on the remote system at 108 (as the remote support agent on the remote system "looks" for data to be received by the remote support enterprise, or rather an indication thereof).

If a problem occurs during the transmission of the core file from the remote system to the remote support enterprise, such that the sending is stopped, the monitoring can detect the problem and resend the core file chunks. At 110, if a stop in the sending of the core file is detected, the core file is securely resent. At 112, resending the core file involves resuming the resending of the core file by beginning with a core file chunk that is next in line/queue after a last full core file chunk was successfully received by the remote support enterprise, prior to the stop being detected by the monitoring. Having successfully sent, or resent (at least part of), the core file, the exemplary method 100 ends at 114.

In another embodiment, for example, when a core dump occurs on a remote system (e.g., a remote storage system having a file server and/or a cluster of storage devices) a core file may be generated that is divided into respective files (chunks) of 1 megabyte in size. In this example, a remote support agent (RSA) (e.g., a program that can automatically diagnose and act upon the remote system, and communicate with a remote support enterprise (RSE)), located on the remote system, may automatically notify a device relationship manager (DRM) in the RSE that a core file has been created. In this embodiment, for example, the RSA may be located on a service processor module (e.g., a communications card) of the remote system, and the RSA may comprise computer programming code within an operating system, for example, configured to act as an agent for the RSE in the remote system, and to communicate with the RSE. It will be appreciated that a RSA can be implemented in hardware, firmware and/or software, and may be located in/on a variety of components of the remote system, such as within different applications and/or in different layers of an operating system, for example.

The DRM can automatically issue a command to the RSA to send the newly created core file to the RSE (e.g., so that the core file may be processed to determine why a core dump occurred). In this example, the RSA may automatically collect a first 1 MB chunk of the core file from the remote system, and begin securely sending the chunk to the DRM. At which time, both the DRM and the RSA can monitor the sending of the chunks. After a chunk is sent, both the RSA and the DRM, in this example, agree that the chunk has successfully been transmitted before a next chunk is collected by the RSA and sent to the DRM. As chunks are sent individually, each transmission is monitored to determine whether the chunks have appropriately arrived at the DRM.

In this embodiment, if the monitoring detects that either side is not communicating (e.g., the remote system goes down during transmission and the DRM does not detect communication for a "timed out" period), they wait until communication is restored and begin resending the core file from a point where communication was interrupted. The DRM can detect if a chunk is being received, and if not it, may wait for a specified "timed out" period (e.g., the DRM may wait a few hours, and if no response is detected, decide that the remote system has lost power) after which the DRM can send a "resend core file chunk" command to the RSA. Further, the RSA can wait for a response from the DRM after a chunk has been sent to the DRM, and if no response is detected within a specified "timed out" period, the RSA may resend the last core file chunk. In this example, because the core file is sent in individual 1 MB chunks, if the DRM detected the communication interruption, it can issue a command to begin resending the next chunk that comes after the last chunk fully received by the DRM. If the RSA detected the communication interruption, it can begin resending a chunk that comes after the last chunk that was communicated as receive by the DRM.

In this embodiment, the RSA can continue to collect core file chunks from the remote system and upload them to the DRM. The DRM may send the uploaded core chunks to a database in the RSE, where they can be used for diagnosis. Unless an error occurs, the RSA will send all of the core file chunks until they are all received by the DRM. If an error occurs, the core file transmission will be restarted from a point where the error occurred, thus uploading the core file in an efficient manner. Either way, the entire core file is uploaded from the remote system to the remote support enterprise.

Figure 2:
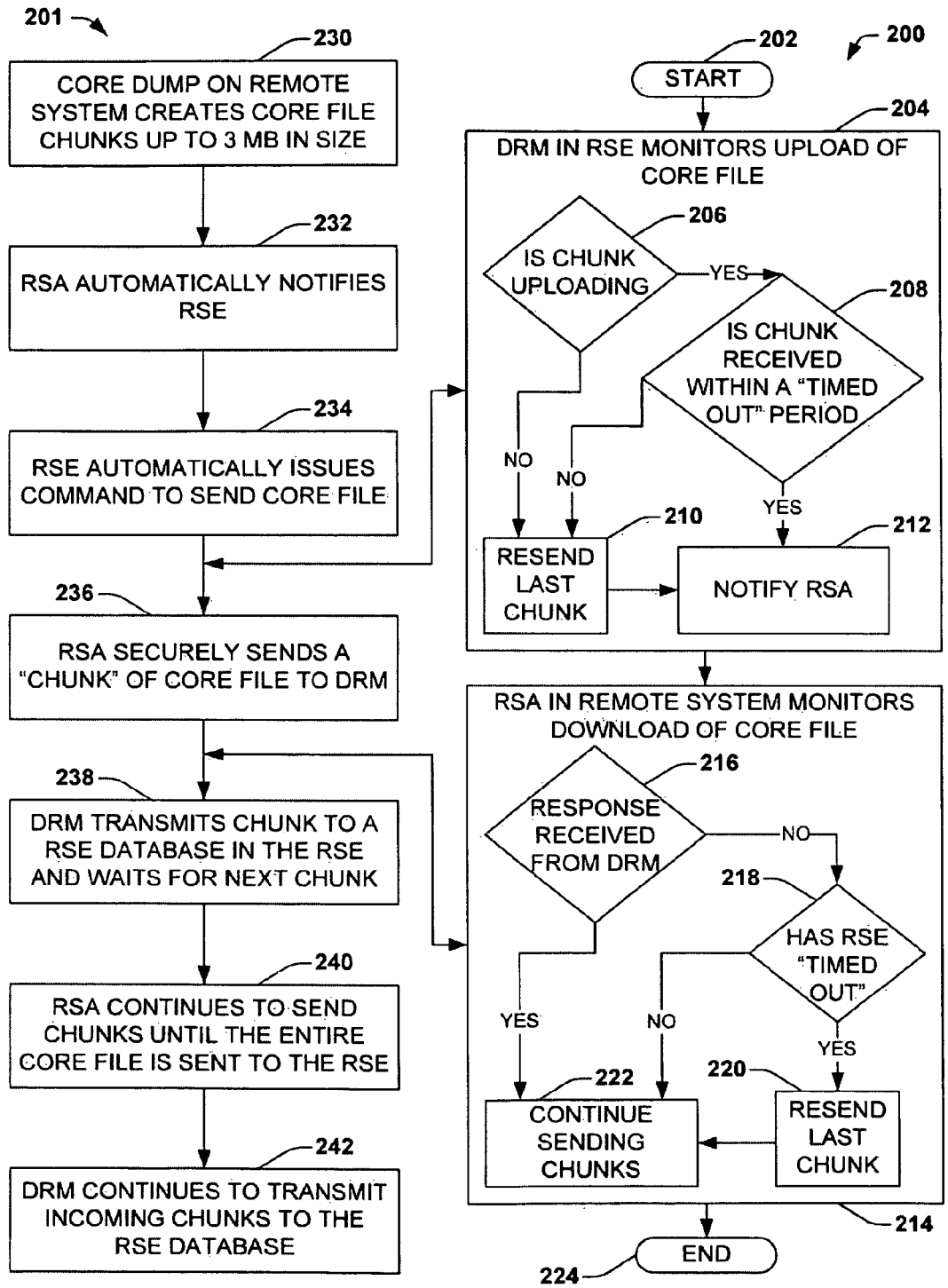
FIG. 2 is a flow diagram illustrating another exemplary method for automatically sending a core file.

FIG. 2 is a flow diagram illustrating an exemplary method 200, for monitoring a secure sending of a core file from a remote system to a remote support enterprise, such as described in FIG. 1, for example. It will be appreciated that, in an effort to provide context, the method of monitoring 200 is described relative to a more global perspective of a method 201 of transferring a core file. At 230, a core dump on a remote system creates a core file, comprising individual chunks up to 3 MB in size, for example. The RSA automatically notifies the RSE about the core file at 232, and the RSE automatically issues a command for the RSA to send the core file at 234.

After the RSE automatically issues a command for the RSA to send the core file at 234, the exemplary method of monitoring 200 begins, at 202, and involves a device relationship manager (DRM), in the RSE, monitoring the upload of the core file from the RSA at 204. Globally, the RSA securely sends a core file chunk to the DRM at 236. At 206 in the monitoring method, the DRM thus detects whether a core file chunk is being uploaded. If a chunk is being uploaded, the DRM continues to monitor the upload. If the chunk is not being uploaded, the DRM issues a command for the RSA to resend the last core file chunk at 210 (e.g., the core file chunk following the most recently successfully transmitted core file chunk). The DRM monitors the upload for a predetermined "timed our period at 208. If the upload "times out," the DRM issues a command for the RSA to resend the last core file chunk at 210. If the chunk is fully received by the DRM, the DRM notifies the RSA that the chunk has been received at 212 (so that additional chunks can then be transmitted).

After a core file chunk is (globally) sent by the RSA to the DRM at 236, the RSA monitors the download from the remote system in method 200 at 214. At 216, the RSA determines whether a response has been received from the DRM that the core file chunk has been successfully downloaded. If a response is received from the DRM, the RSA collects the next chunk from the remote system for sending to the DRM at 222. On the other hand, if a response is not received from the DRM, the RSA continues to monitor for a predetermined "timed out" period at 218. If the RSA does not receive a response from the DRM, that the core file chunk has been successfully downloaded, and determines the DRM has "timed out," the RSA resends the last chunk to the DRM at 220 (e.g., the core file chunk following the core file chunk that was successfully transmitted most recently). If the response is received within the "timed out" period, the RSA sends the next chunk to the DRM at 222.

Within the global context 201 of transferring a core file, when a chunk is successfully received by the DRM, it is passed to a database in the RSE for storage at 238. If no transmission errors are detected by the monitoring (e.g., 204 and/or 214 in method 200) the RSA continues to collect core file chunks from the remote system and securely send them to the DRM of the RSE until the entire core file has been transmitted at 240. At 242, the DRM continues to pass the core file chunks to the RSE database, until the entire core file has been collected, at which time the monitoring of the secure core file transmission ends at 224.

Figure 4:
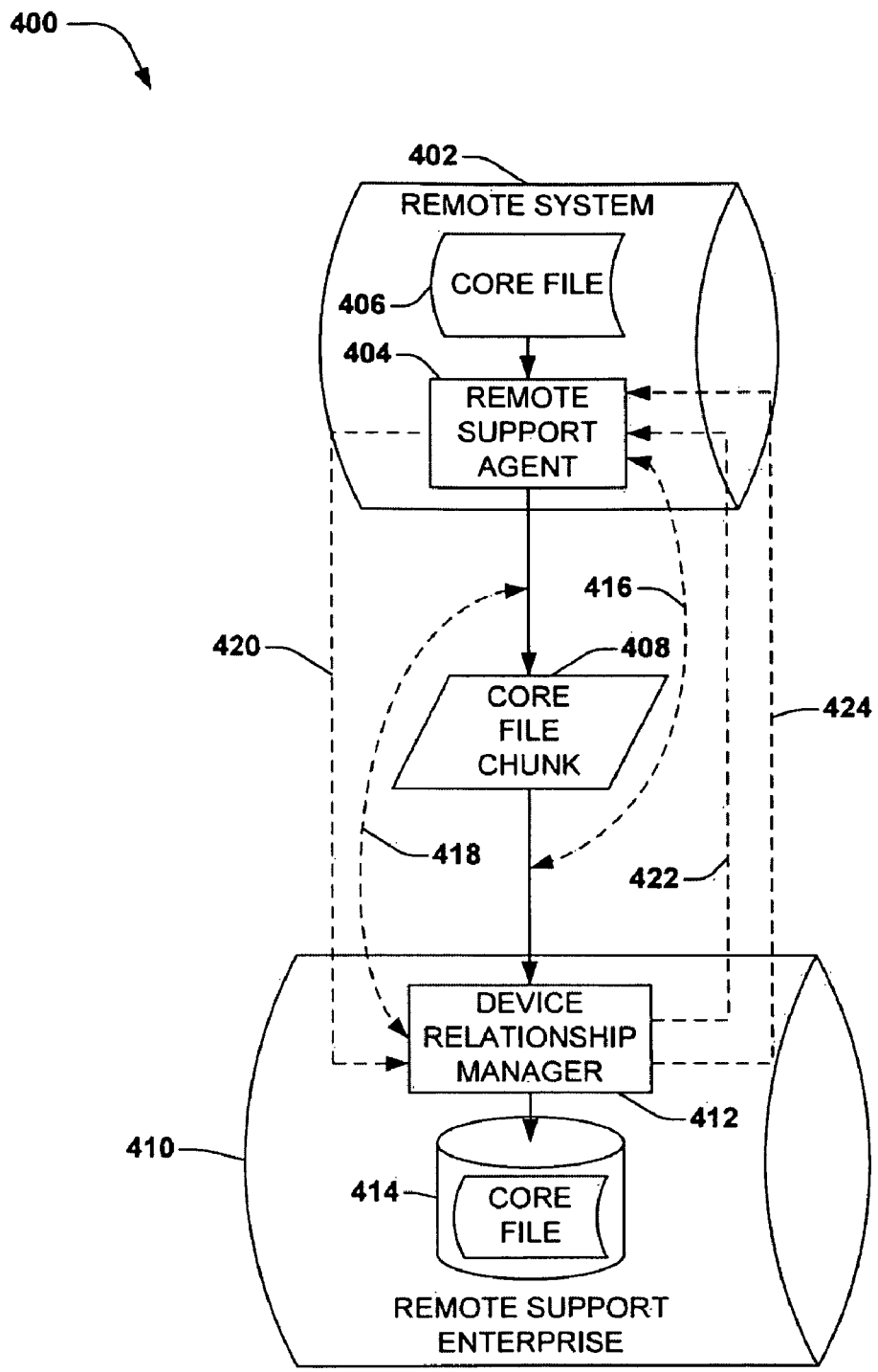
FIG. 4 is an illustration of an exemplary configuration of monitoring a core file transmission.

An example 400 of how a core file transfer may be monitored is illustrated in FIG. 4. A remote system 402 (e.g., a file storage system located in a remote site) may create a core file 406 (e.g., divided into smaller files called "chunks") from a core dump (e.g., that occurs after the system experiences an unrecoverable error). A remote support agent 404 (RSA) (e.g., a program that can communicate securely with a remote support enterprise 410, such as with HTTPS, encryption and/ or decryption) is notified of the core file creation and sends a notification 420 to a device relationship manager 412 (DRM) of a remote support enterprise 410. In this example, the DRM 412 receives the notification 420 and automatically sends a command 422 to the RSA 404 to "send the core file." Once the command 422 is sent the DRM begins monitoring 418 for an upload of a first core file chunk 408 from the RSA 404. The RSA 404 can collect a first chunk of the core file 406 from the remote system 402 and transmit it to the DRM 412. Once a core file chunk 408 is sent to the DRM 412, the RSA 404 can begin monitoring 416 for a signal 424 from the DRM 412 that the chunk has been received in full and to send the next chunk.

In this example, as core file chunks 408 are sent from the RSA 404 to the DRM 412, each side monitors the transmission to determine whether respective chunks 408 are fully received by the DRM 412. For example, the DRM monitors 418 by waiting for an upload after sending a command 422 to send a next chunk, and the RSA monitors 416 by waiting for a command 424 from the DRM 412 to send the next chunk after the RSA 404 sends a chunk 408. Further, in this example, because the core file 406 is divided into chunks, if a problem occurs in the transmission, only those chunks that have not yet been received by the DRM may have to be sent, instead of resending the entire core file 406. Once the chunks are received by the DRM 412, they are collected in a database 414 in the remote support enterprise 410 for later use in diagnosis.

In one aspect, a core file is transmitted from a remote system to a support enterprise securely. As described above, due to a likelihood that the core file contains sensitive information, it may require security during transmission. Sending information securely typically takes a longer amount of time and may require more computing resources, therefore the methods and systems described herein facilitate transmitting a core file securely, while mitigating transmission time. As an example, a core file may be securely transmitted from a remote system to a support enterprise using Hypertext Transfer Protocol over Secure Socket Layer (HTTPS). Further, secure transmission and communication may be accomplished using various encryption and/or decryption techniques devised for web and/or network communication.

Figure 5:
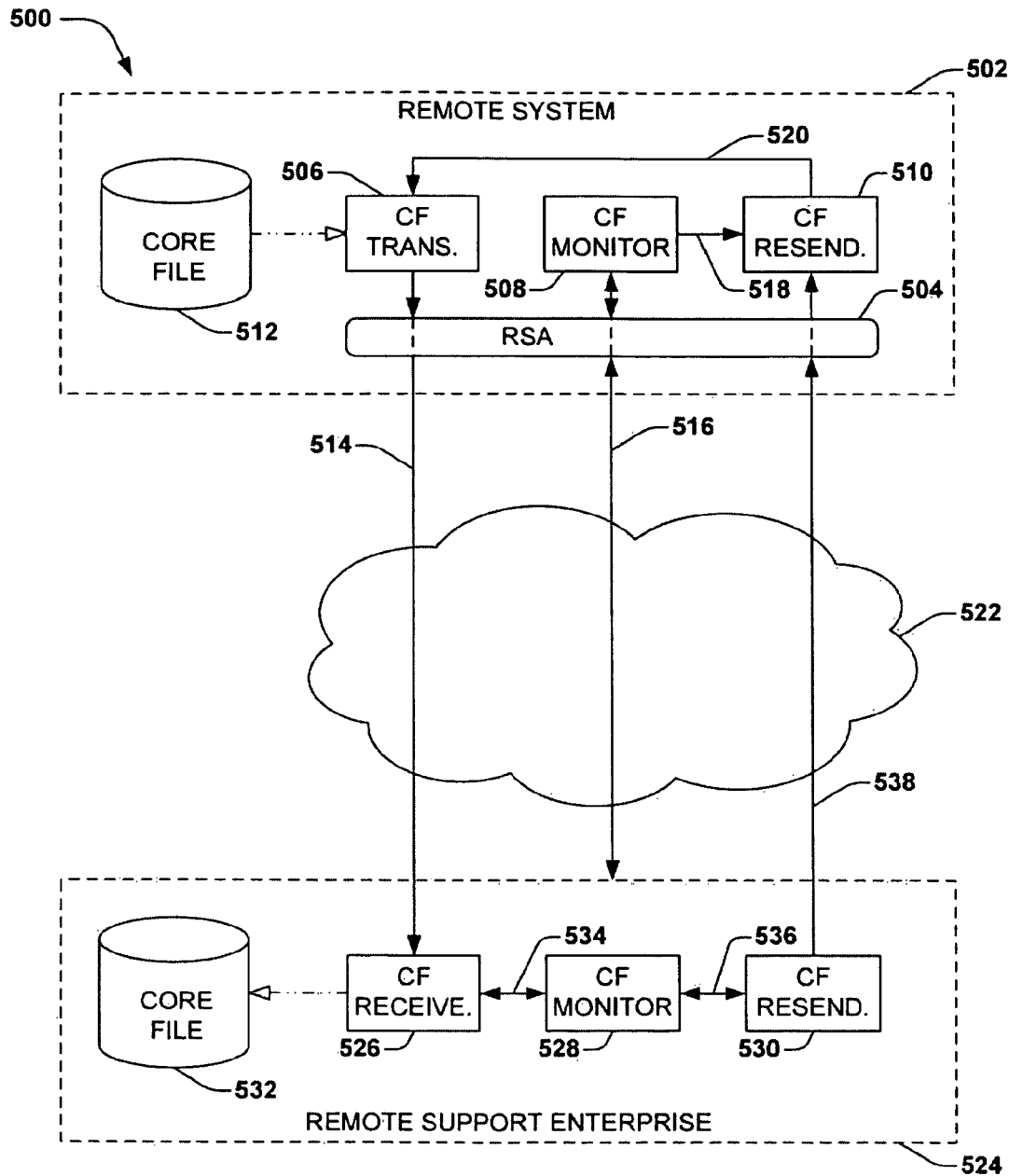
FIG. 5 is a schematic block diagram illustrating an exemplary system for automatically sending a core file from a remote system to a support enterprise.

A system may be devised for automatically, securely transmitting a core file from a remote system to a support enterprise, such that the core file transmission may be monitored. FIG. 5 is a schematic block diagram illustrating an exemplary system 500 that may be used for transmitting a core file and monitoring the transmission, as provided herein. In one example, the system 500 implements a secure connection between a remote system 502 and a remote support enterprise (RSE) 524. The secure connection may utilize the Internet 522, for example, for transferring files and commands between the remote system 502 and the RSE 524 (although systems and/or techniques instead of or in addition to the Internet may be used and are contemplated).

The remote system 502 comprises a remote support agent 504 (RSA), which is configured to securely communicate with the RSE 524. Further, the remote system 502 comprises a core file transmitter 506, which is configured to collect a core file 512 and transmit it 514 to a core file receiver 526 in the RSE 524. Transmission 514 of the core file is facilitated by the RSA 504, which utilizes a secure connection. The remote system 502 also comprises a core file upload monitor 508, which is configured to monitor 516 a transmission of the core file 512 to the RSE 524. Monitoring 516 of the core file transmission is facilitated by the RSA 504, which uses a secure connection with the RSE 524. The remote system 502 also comprises a core file resender 510, which is configured to facilitate resending portions of the core file not received by the RSE 524, after a stop in transmission is detected, using the core file transmitter 506. It will be appreciated that while the RSA 504, core file transmitter 506, core file upload monitor 508 and core file resender 510 are illustrated as separate components, they may be combined in any manner and/or be comprised with any number of components. For example, the core file transmitter 506, core file upload monitor 508 and core file resender 510 may be comprised within the RSA 504.

The RSE 524 comprises a core file receiver 526, which is configured to receive a core file 512 from the remote system 502 and move it to a database 532 in the RSE 524. The RSE 524 also comprises a core file download monitor 528, which is configured to monitor 534 receipt of the core file 512 (at receiver component 526) from the remote system 502. A notification resender 530 is also comprised within the RSE 524 and is configured to notify 538 the remote system which portions of the core file have been received by the RSE 524 when a stop in the transmission/receiving of the core file 512 is detected. In this example, a stop in the transmission of the core file 512 may be detected by consulting the download monitor 528, or rather receiving an indication 536 therefrom that transmission has been interrupted.

In the exemplary system 500, a core file may be created (e.g., in a plurality of chunks) and the core file transmitter 506 can collect the core file 512, and transmit chunks of it securely 514, using the RSA 504, across the connection 522 to the core file receiver 526 in the RSE. At or near the time of transmission 514, the core file upload monitor 508 monitors 516 for a response from the RSE 524 that the core file is received; and the core file download monitor 528 monitors 534 the core file receiver 526 to determine that a core file 512 is being sent 514. If the core file upload monitor 508 detects that a core file has not been received by the RSE 524, it notifies 518 the core file resender 510, which sends a command 520 to the core file transmitter 506 to resend the last core file sent 514. If the core file download monitor 528 detects 534 that a core file is not sent by the RSA 504, the core file download monitor 528 notifies 536 the core file notification sender 530, which sends a command 538 to the RSA 504, which notifies the core file resender 510, to resend the last core file (which it does by issuing a command 520 to the core file transmitter 506).

In another embodiment, a system for automatically sending a core file and monitoring the sending may comprise a remote filer (e.g., a remote storage system, server and/or computer operable to manage date stored on storage device media, such as at a business customer location, for example) connected securely to a remote support enterprise (e.g., an automatic support system at a support vendor site, configured to automatically provide support to a remote storage system) through the Internet, for example. In this embodiment, a secure connection may be created by using a remote service processor (e.g., a remote LAN manager, such as may be commercially available as a machine embedded interface card from NetApp, Inc. of Sunnyvale, Calif.) on the remote filer, and a device relationship manager (DRM) on the remote support enterprise, configured to securely communicate through the Internet, for example.

Figure 6:
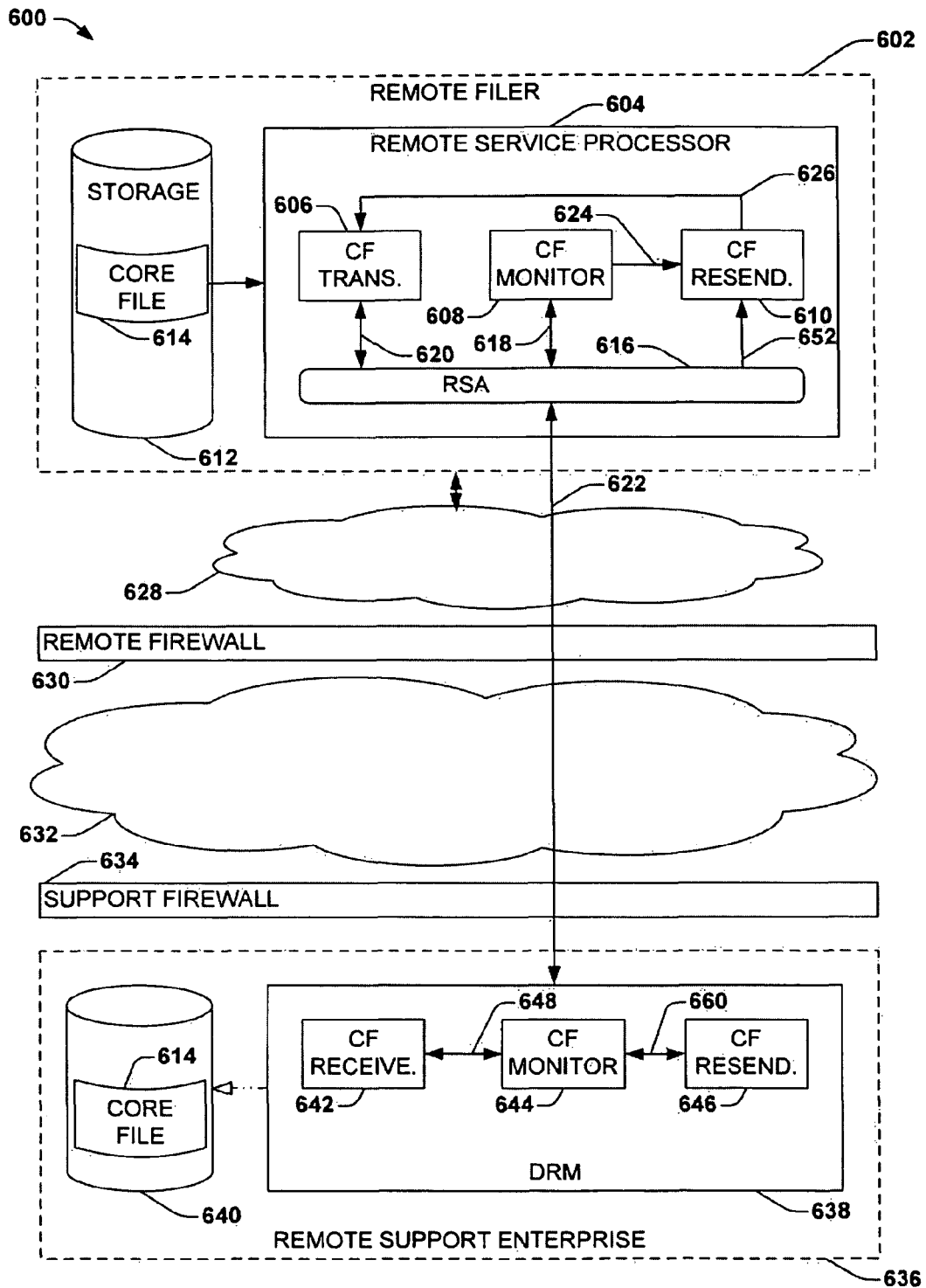
FIG. 6 is another schematic block diagram illustrating an exemplary system for automatically sending a core file from a remote system to a support enterprise.

Another exemplary system 600 for automatically sending a core file and monitoring the sending is illustrated in FIG. 6. The exemplary system 600 comprises a remote filer 602 and a remote support enterprise (RSE) 636, connected to each other through the remote filer's network 628, the remote filer's firewall 630, the Internet 632, for example, and the remote support enterprise's firewall 634.

The remote filer 602 comprises a storage system 612, which may contain a core file 614 (e.g., if a core dump occurs); and a remote service processor 604 (e.g., a remote LAN manager), which is configured to communicate securely 622 (e.g., send files and receive commands) with the RSE 636. In the exemplary system 600, the remote service processor 604 comprises a remote support agent 616 (RSA), which is configured to securely communicate with a DRM 638 in the RSE 636. Further, the remote service processor 604 comprises a core file transmitter 606, which is configured to send 620 the core file 614 to the RSA 616; a core file upload monitor 608, which is configured to monitor 618 a transmission of the core file 614 to the DRM 638, using the RSA 616; and a core file resender 610, which is configured to facilitate resending one or more portions of the core file not received by the DRM 638, after a stop in transmission is detected, using the core file transmitter 606. It will be appreciated that while the RSA 616, core file transmitter 606, core file upload monitor 608 and core file resender 610 are illustrated as separate components, they may be combined in any manner and/or be comprised with any number of components. For example, the core file transmitter 606, core file upload monitor 608 and core file resender 610 may be comprised within the RSA 616.

In the exemplary system 600, the remote support enterprise 636, comprises a database 640 configured to store incoming core files (e.g., a core file 614); and a DRM 638, configured to communicate securely 622 with the RSA 616 in the remote filer 602, and send incoming core files to the database 640. Further, the DRM 638 comprises a core file receiver 642, which is configured to receive a core file 614 from the remote filer 602; and a core file download monitor 644, which is configured to monitor 648 receipt of the core file 614 (at receiver component 642) from the remote filer 602; and a notification resender 646, which is configured to notify the RSA 616 which portions of the core file were received by the DRM 638, after a stop in the receiving of the core file 614 is detected.

In the exemplary system 600, a core file may be created (e.g., in a plurality of chunks) and the remote service processor 604 can collect the core file 614 using the core file transmitter 606, and transmit it 620 through the RSA 616, securely across the secure connection 622 to the core file receiver 642 in the DRM 638. At or near the time of transmission 622, the core file upload monitor 608 monitors 618 for a response from the DRM 638 (using the RSA 616) that the core file is received; and the core file download monitor 644 monitors 648 that a core file 614 is being sent to the core file receiver 642. If the core file upload monitor 608 detects that a core file has not been received by the DRM 638 (e.g., the RSA 616 does not receive a notice from the DRM 638 that the core file has been received), it notifies 624 the core file resender 610, which sends a command 626 to the core file transmitter 606 to resend the last core file sent. If the core file download monitor 644 detects 648 that a core file has not been sent by the RSA 616 to the core file receiver 642, the core file download monitor 644 notifies 660 the notification resender 646, which sends a command to the RSA 616, which notifies 652 the core file resender 610, to resend the last core file (which it does by issuing a command 626 to the core file transmitter 606).

Operationally, for example, a system for monitoring a transmission of a core file from a remote system to a support enterprise, such as described in FIG. 6, may utilize "time out" protocols. In this example, after a DRM in a remote support enterprise sends a command to an RSA in a remote system, the DRM can monitor for a specified time period, for a response from the RSA (e.g., a response such as sending a chunk of a core file). If a response has not been received by the DRM within the specified time period the DRM may presume that there has been a problem at the remote system (e.g., a power failure that caused the remote system to shut down, thereby resetting the system and negating the core file upload), and can resend a command to begin sending the core file from after a last chunk that was successfully received by the DRM.

Further, in this example, if after the RSA sends a chunk of the core file to the DRM, the RSA can monitor for a specified time period, for a response from the DRM (e.g., a response such as "core file received"). If a response has not been received by the RSA within the specified time period, the RSA may presume that there has been a problem at the support enterprise, or in the communication itself, and resend the core file from a chunk after the last chunk that was fully received and acknowledged by the DRM. In this way, the transmission of the core file is monitored automatically, and if a problem occurs in the transmission, only those portions of the core file that have not yet been fully transmitted may be sent, instead of the entire core file.

Figure 7:
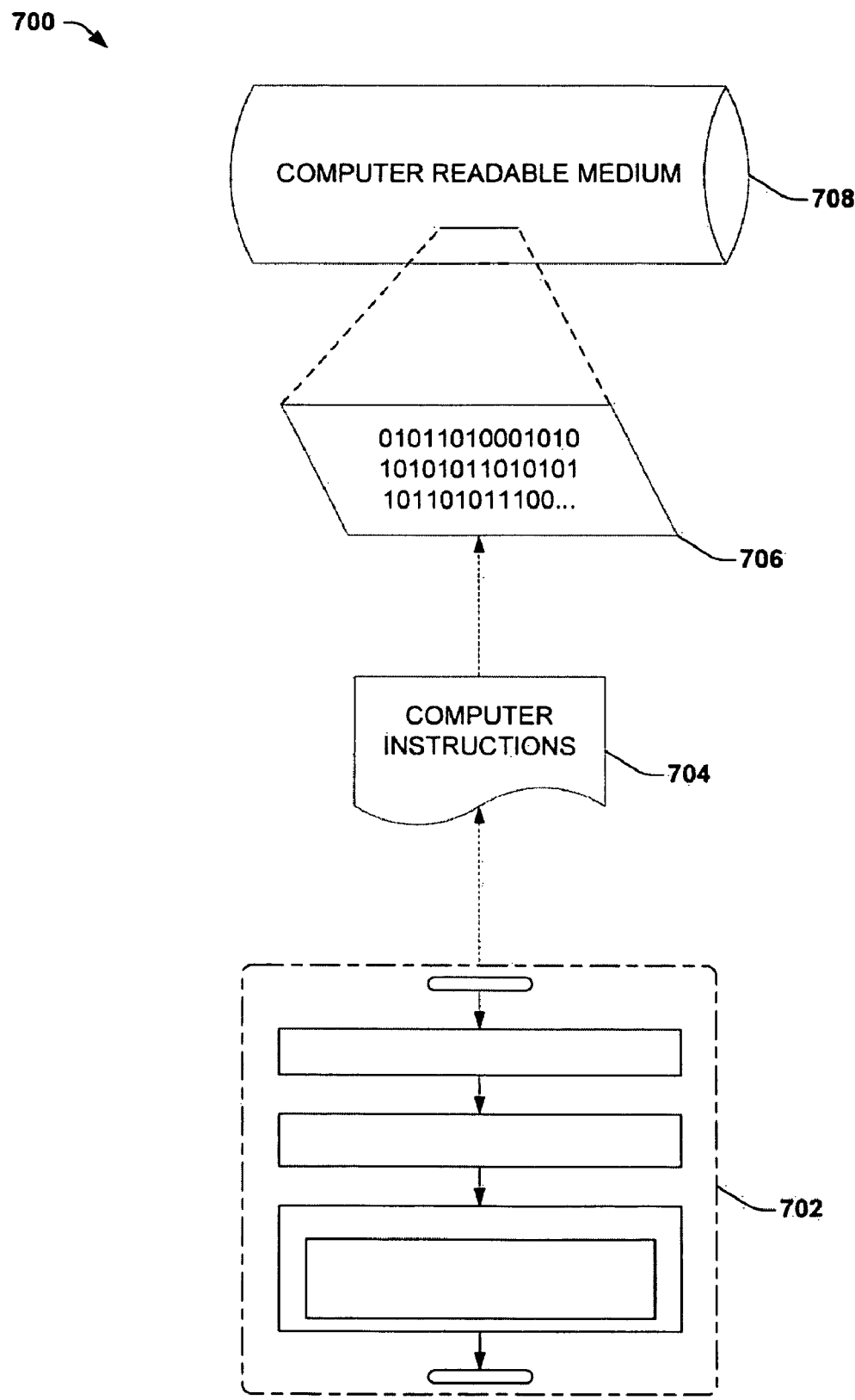
FIG. 7 is an illustration of an exemplary computer-readable medium comprising processor-executable instructions configured to embody one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to the principles set forth herein. In one such embodiment, the processor-executable instructions 704 may be configured to perform a method 702 for automatically sending a core file from a remote system to a support enterprise, such as the method 100 of FIG. 1, for example. Many such computer-readable media may be devised by those of ordinary skill in the art that are configured to operate in accordance with the techniques presented herein.

It will be appreciated that processes, architectures and/or procedures described herein can be implemented in hardware, firmware and/or software. For example, a secure communication channel between a remote system and a support enterprise may be implemented over an Intranet, or another implementation that provides secure connections between the two systems.

It will also be appreciated that the provisions set forth herein may apply to any type of special-purpose computer (e.g., file server, filer and/or storage serving appliance) and/or general-purpose computer, including a standalone computer or portion thereof, embodied as or including a storage system. Moreover, the teachings herein can be adapted to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

The operations herein described are exemplary and imply no particular order. Further, the operations can be used in any sequence when appropriate and can be partially used (e.g., not all actions may be necessary). It should be understood that various computer-implemented operations involving data storage may comprise manipulation of physical quantities that may take the form of electrical, magnetic, and/or optical signals capable of being stored, transferred, combined, compared and/or otherwise manipulated, for example.

Another example involves computer-readable media comprising processor-executable instructions configured to implement one or more of the techniques presented herein. Computer readable media is intended to comprise any mechanism that can store data, which can be thereafter be read by a computer system. Examples of computer readable media include hard drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

The foregoing description has been directed to particular embodiments. It will be apparent, however, that other variations and modifications may be made to the described embodiments, with the attainment of some or all of their advantages. Specifically, it should be noted that one or more of the principles set forth herein may be implemented in non-remote file systems. Furthermore, while this description has been written in terms of separate remote and support systems, the teachings are equally suitable to systems where the functionality of remote and support systems are implemented in a single system. Alternately, the functions of the remote and support systems may be distributed among any number of separate systems, wherein respective systems perform one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the spirit and scope of the disclosure herein.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, the word "exemplary" is used herein to mean serving as an example, instance, or illustration. That is anything described herein as "exemplary" is not necessarily to be construed as advantageous over other aspects or designs. Also, unless specified to the contrary, the term "or" is intended to mean an inclusive "or" rather than, an exclusive "or", and the articles "a" and "an" are generally to be construed to comprise "one or more". Furthermore, to the extent that the terms "includes", "having", "has", "with", or variants thereof are used, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

What is claimed is:

1. A method for automatically transmitting a core file from a remote system to a remote support enterprise, comprising:
    separately transmitting respective individual core file chunks of the core file divided into a plurality of chunks from the remote system to the remote support enterprise;
    monitoring at least some of the separate transmission of respective individual core file chunks using a remote support agent on the remote system; and
    if a stop in the transmission is detected, resuming the transmission of respective individual core file chunks beginning with a next core file chunk after a last full core file chunk is successfully transmitted.

2. The method of claim 1, separately transmitting respective individual core file chunks comprising:
    using the remote support agent on the remote system to separately send the respective individual core file chunks.

3. The method of claim 1, monitoring the separate transmission comprising:
    monitoring an upload of the core file from the remote support agent using the remote support enterprise.

4. The method of claim 3, monitoring the upload comprising:
    detecting a response from the remote support agent after a command is transmitted to the remote support agent to send the core file.

5. The method of claim 1, monitoring the separate transmission comprising:
    monitoring a download of the core file to the remote support enterprise using the remote support agent.

6. The method of claim 5 monitoring the download comprising:
    detecting a response from the remote support enterprise that a file core chunk was received.

7. The method of claim 1, comprising separately transmitting respective individual core file chunks securely.

8. The method of claim 7, securely transmitting chunks comprising implementing Hypertext Transfer Protocol over Secure Socket Layer (HTTPS).

9. The method of claim 7, securely transmitting chunks comprising implementing a security protocol using encrypted data.

10. The method of claim 1, comprising detecting a stop in transmission by determining that a successful transmission of a core file chunk has not occurred within a specified time out period.

11. The method of claim 1, comprising detecting a stop in transmission when
    the remote support agent determines that it has not received communication from the remote support enterprise within a specified time out period.

12. The method of claim 1, comprising:
    before transmitting respective individual core file chunks of the core file, sending to the remote support enterprise a notification that a core file has been created; and
    receiving a command from the remote support enterprise to begin transmitting individual core file chunks of the core file to the remote support enterprise after sending the notification.

13. The method of claim 1, comprising creating the core file in response to an unrecoverable error in a storage system operatively coupled to the remote system.

14. The method of claim 1, comprising dividing the core file into chunks, respective chunks comprising at least 1 MB of data.

15. A system configured to automatically transmit respective individual core file chunks of a core file divided into a plurality of chunks, the system comprising:
    a core file transmitter configured to automatically transmit respective individual core file chunks from a remote system to a remote support enterprise;
    a core file upload monitor configured to monitor at least some of the transmission of the respective individual core file chunks from the remote system to the remote support enterprise; and
    a core file resender configured to facilitate resending a last chunk of the respective individual core file chunks from the remote system to the remote support enterprise after a stop in the transmission is detected, wherein the core file transmitter, the core file upload monitor, and the core file resender are comprised within the remote system.

16. The system of claim 15, comprising:
a remote support agent configured to facilitate secure transmission of respective individual core file chunks.

17. The system of claim 15, comprising:
a remote support agent configured to detect a stop in the transmission by determining that a communication has not been received from the remote support enterprise within a specified time out period, the remote support agent comprised within the remote system.

18. The system of claim 15, comprising:
a device relationship manager (DRM) comprised within the remote support enterprise, and comprising:
 a core file receiver configured to receive respective individual core file chunks from the remote system;
 a core file download monitor configured to monitor receipt of respective individual core file chunks from the remote system; and
 a notification sender configured to notify the remote system of the last individual core file chunk successfully received from the remote system.

19. A method for automatically transmitting a core file from a remote system to a remote support enterprise, comprising:
 detecting an unrecoverable error in a storage system;
 creating the core file comprising a snapshot of at least one of a processor state and memory of the storage system in response to the detected unrecoverable error;
 separately transmitting respective individual core file chunks of the core file from the remote system to the remote support enterprise;
 monitoring the separate transmission of respective individual core file chunks; and
 if a stop in the transmission is detected, resuming the transmission of respective individual core file chunks beginning with a next core file chunk after a last full core file chunk is successfully transmitted.

20. The method of claim 19, comprising, sending a notification to the remote support enterprise that individual core file chunks of the core file are ready to begin being transferred from the remote system to the remote support enterprise.

* * * * *